United States Patent
Metcalfe et al.

(10) Patent No.: US 10,986,250 B1
(45) Date of Patent: Apr. 20, 2021

(54) SYSTEM AND METHOD TO DETECT AND ADJUST IMAGE BACKGROUND

(71) Applicant: Xerox Corporation, Norwalk, CT (US)

(72) Inventors: David J. Metcalfe, Marion, NY (US); Peter D. McCandlish, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/830,419

(22) Filed: Mar. 26, 2020

(51) Int. Cl.
  *H04N 1/60* (2006.01)
  *H04N 1/407* (2006.01)

(52) U.S. Cl.
  CPC ......... *H04N 1/6005* (2013.01); *H04N 1/4072* (2013.01); *H04N 1/6008* (2013.01); *H04N 1/6077* (2013.01)

(58) Field of Classification Search
  CPC combination set(s) only.
  See application file for complete search history.

(56) References Cited

U.S. PATENT DOCUMENTS

| 7,551,334 B2* | 6/2009 | Li | H04N 1/4072 358/3.23 |
| 7,843,616 B2* | 11/2010 | Li | H04N 1/6094 358/518 |
| 2017/0255849 A1 | 9/2017 | Li et al. | |

* cited by examiner

*Primary Examiner* — Barbara D Reinier
(74) *Attorney, Agent, or Firm* — Fay Sharpe LLP

(57) ABSTRACT

An image processing device and method are provided for adjusting background pixels of an image. The device includes memory which stores a background adjustment component which for each of a plurality of pixels of an input image: computes a background strength of the pixel; computes a luminance strength of the pixel; and computes adjusted luminance and adjusted chrominance values for the pixel, as a function of the background strength and luminance strength of the pixel. An image output component outputs an output image derived from the adjusted luminance and adjusted chrominance values for the plurality of pixels, A processor implements the background adjustment component and image output component.

20 Claims, 18 Drawing Sheets

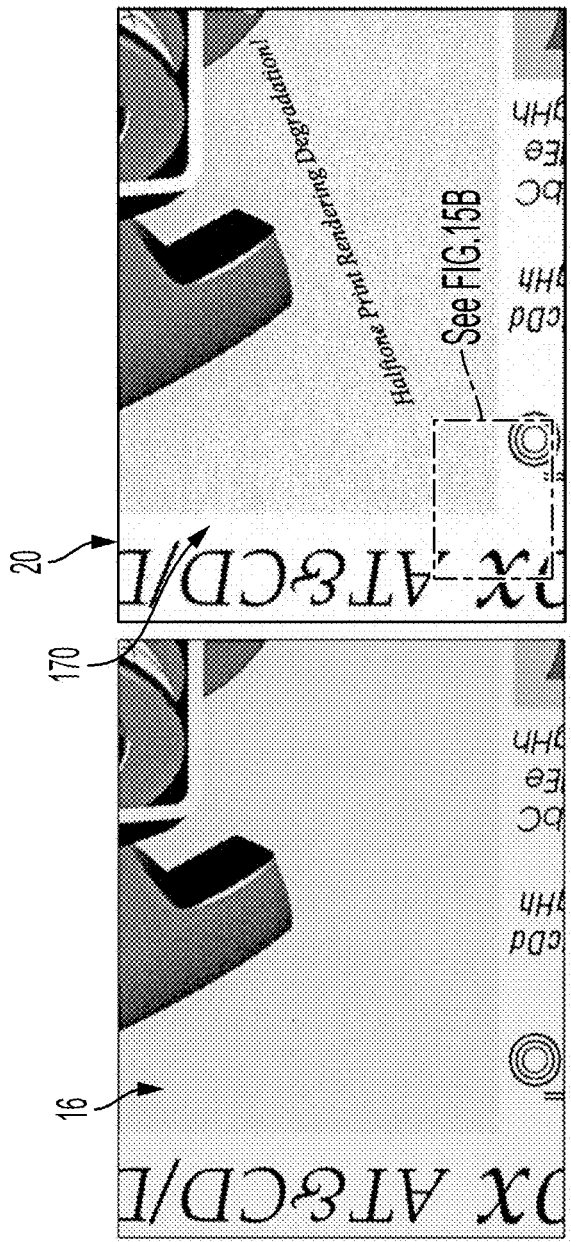
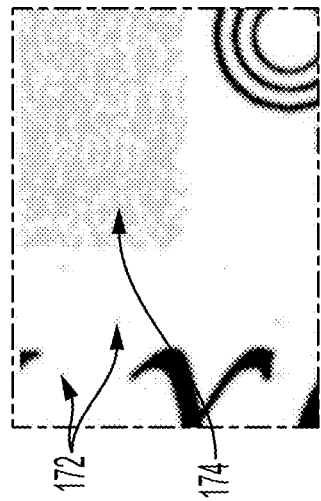
FIG. 15A
FIG. 15B

SYSTEM AND METHOD TO DETECT AND ADJUST IMAGE BACKGROUND

CROSS REFERENCE TO RELATED PATENTS AND APPLICATIONS

Cross-reference is made to copending application Ser. No. 16/830,479, entitled SYSTEM AND METHOD FOR PROCESSING AND ENHANCING ACHROMATIC CHARACTERS OF SCANNED DIGITAL DOCUMENTS, by Metcalfe, filed Mar. 26, 2020, the disclosure of which is incorporated herein by reference in its entirety.

BACKGROUND

The exemplary embodiment relates to image adjustment and finds particular application in a system and method for background adjustment.

Digital image capture devices, such as scanners and cameras, capture images as an array of pixels, with each pixel being assigned a set of color values in a multi-dimensional color space, such as RGB (red, green, blue) color space, referred to herein as an input color space. Processing images captured by digital devices is generally performed in a multi-dimensional color space with a larger gamut, such as the L*a*b* color space, referred to herein as a processing color space. The processed image may then be converted to a multi-dimensional output color space, suitable for rendering the processed image, such as CMYK (Cyan, Magenta, Yellow, and Black), in the case of printing.

During image processing, various adjustments to the image may be made, these adjustments are often performed sequentially, and may include image resolution adjustments, color corrections, removal of undesirable artifacts, cropping, and background suppression.

Background suppression is a useful function provided by the image path in copiers and multi-functional systems that removes or unifies the color of the background in the digitally acquired image. Background suppression removes the background or makes the background uniform to make the electronic image appear more uniform and consistent. Background suppression is more difficult for input images that contain poor contrast between foreground and background regions. Unwanted background may exist for many reasons, such as an aged, discolored, and/or dirty document(s) which are scanned to produce the input images. Additionally, the original may be printed on a color substrate or recycled paper which the customer generally does not want to reproduce. Thin paper stock may also be problematic, as this tends to increase the probability of show-through created by detecting and rendering content from the opposite side of a 2-sided print. Users generally do not want to have extraneous dots or background reproduced in their copies but rather desire to have a faithful rendition of the actual content contained within the original print. Background suppression helps to improve the contrast between the foreground and background regions.

In order to achieve an acceptable throughput, the complexity of background suppression algorithms has generally been limited by the processing capabilities of image processing devices, such as printer processors. Algorithms have been developed which segment images into foreground and background regions and then apply a correction only to the background regions. A threshold is set with the aim of producing uniform background region(s), typically white (no color), without undesirably impacting the foreground region(s). The threshold may be close to, but less than, the maximum value. On the luminance channel, for example, with a scale of 0-255, where 0 is black and 255 is white, a threshold value 250 could be set and all pixel values at or above the threshold are increased, by applying a gain, to bring them to 255, i.e., white. However, pixels below 250 are not adjusted, remaining gray. The chrominance channels may be similarly adjusted. As a result, in many existing threshold-based segmentation classification algorithms, abrupt switching artifacts may be generated, which are visible in the output image as uneven foreground or background regions. These are often referred to as "punch-through" artifacts in halftone and highlight regions.

Further, advancements in the number of bits-per-pixel (bpp) available in output devices, such as marking engines, such as the change from 1 bpp to 8 bpp, have meant that these artifacts are more noticeable. Recently, advances have been made in processing hardware, allowing more complex algorithms to be used without impacting throughput.

A system and method for background suppression/adjustment are disclosed which can leverage the processing capabilities of more advanced processors to minimize the artifacts which may occur during background suppression.

INCORPORATION BY REFERENCE

The following reference, the disclosure of which is incorporated herein in its entirety by reference, is mentioned.

U.S. Pub. No. 20170255849 A1, published Sep. 7, 2017, entitled DOCUMENT BACKGROUND SUPPRESSION PERFORMED DURING COLOR SPACE CONVERSION, by Xing Li, et al., describes making background suppression corrections to an image after being converted from a first to a second color space and then into a third color space used by printing devices. The process of converting the image into the third color space samples nodes of the second color space values, classifies the nodes as background nodes or non-background nodes, multiplies the second color space values of the background nodes by a percentage less than 100%, and after multiplying, interpolates values between the nodes.

BRIEF DESCRIPTION

In accordance with one aspect of the exemplary embodiment, an image processing device includes memory which stores a background adjustment component which for each of a plurality of pixels of an input image, computes a background strength of the pixel, computes a luminance strength of the pixel, and computes adjusted luminance and adjusted chrominance values for the pixel, as a function of the background strength and luminance strength of the pixel. An image output component outputs an output image derived from the adjusted luminance and adjusted chrominance values for the plurality of pixels. A processor implements the background adjustment component and image output component.

In accordance with another aspect of the exemplary embodiment, an image processing method includes receiving an input image comprising a plurality of pixels, and for each of the plurality of pixels, computing a background strength of the pixel, computing a luminance strength of the pixel, and computing an adjusted luminance value and adjusted chrominance values for the pixel, as a function of the background strength and luminance strength of the pixel. The method further includes outputting an output image derived from the adjusted luminance and adjusted chrominance values for the plurality of pixels.

One or more steps of the method may be performed with a processor.

In accordance with another aspect of the exemplary embodiment, an image processing device includes an image adjustment unit which receives an input image. The image adjustment unit includes a background adjustment component which for each of a plurality of pixels of an input image, computes a background strength of the pixel, computes a luminance strength of the pixel, and computes adjusted luminance and adjusted chrominance values for the pixel, as a function of the background strength and luminance strength of the pixel. An image output device receives an output image derived from the adjusted luminance and adjusted chrominance values for the plurality of pixels, and renders the output image by printing.

BRIEF DESCRIPTION OF THE DRAWINGS

FIG. 15, which is split into FIGS. 15A and 15B for ease of illustration, illustrates problems with existing background suppression methods.

DETAILED DESCRIPTION

Figure 1:
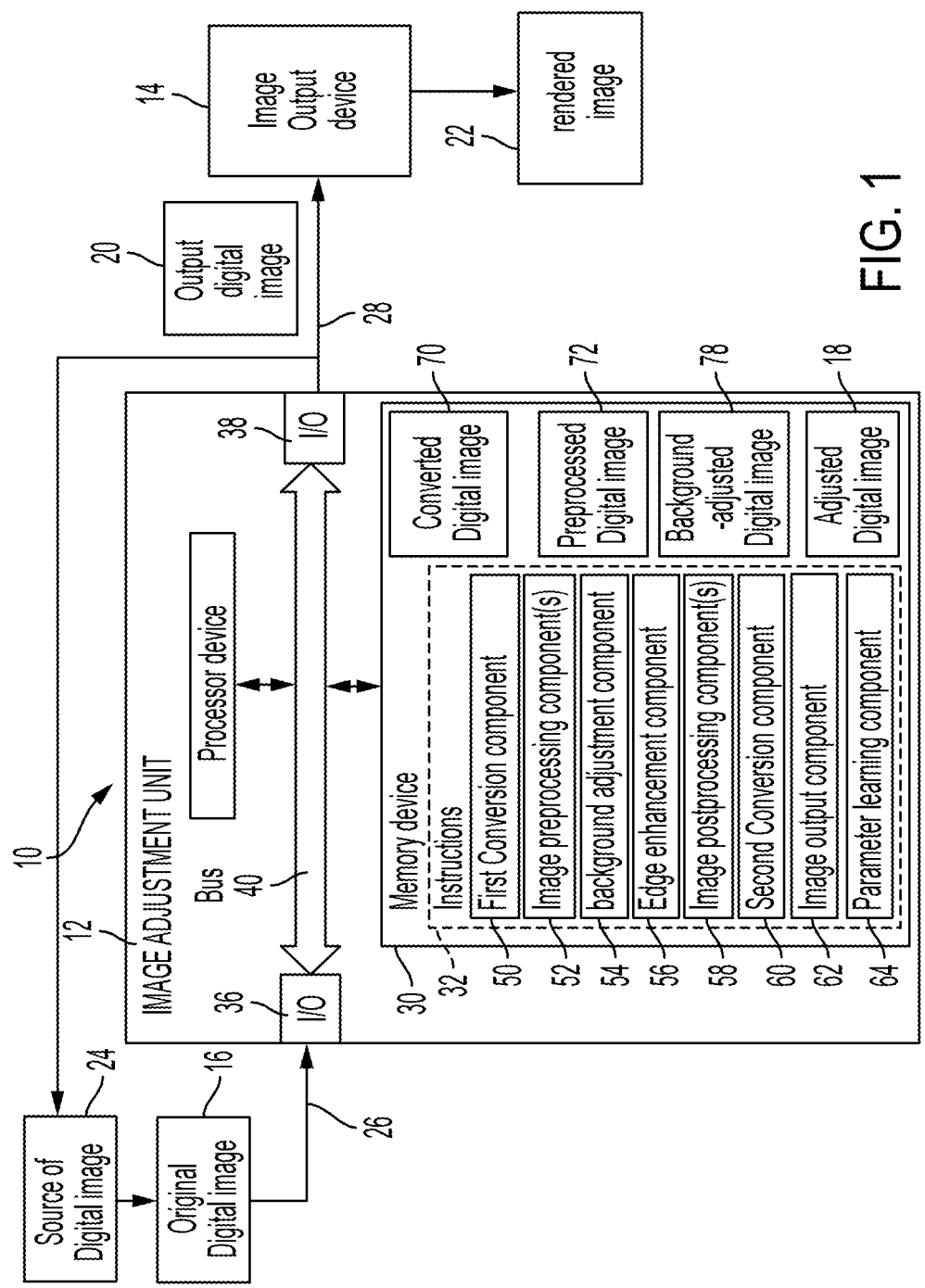
FIG. 1 is a functional block diagram of an image processing device incorporating a background adjustment component in accordance with one aspect of the exemplary embodiment.

A system and method are described which provide image processing while minimizing artifacts occurring during background suppression. The background suppression may form a step in a software image path (SWIP), as described herein, or be performed as a stand-alone operation.

The system and method identify potential background pixels and process them in a non-uniform manner. The extent in which any background pixels are driven toward "pure white" is now based upon the "background strength" (or neutral strength) of a pixel as opposed to being fully labeled/classified as "background" versus "non-background."

The system and method process an image to identify potential background pixels, i.e., pixels which are close to neutral. These identified pixels are produced in a variable manner, with the extent to which any potential background pixels are driven toward "pure white" (i.e., $L*a*b*$=255, 128, 128, respectively) being based upon a background strength of the pixel in question and also a luminance strength of the pixel.

As used herein, an "image processing device" can include any device for rendering an image on print media, such as a copier, laser printer, bookmaking machine, facsimile machine, or a multi-function machine (which includes one or more functions such as scanning, printing, archiving, emailing, and faxing).

"Print media" can be a physical sheet of paper, plastic, or other suitable physical print media substrate for carrying images. For example, the print media can be substantially any type of media upon which a marking engine can print, such as: high quality bond paper, lower quality "copy" paper, overhead transparency sheets, high gloss paper, colored paper, and so forth. A "job" or "document" is referred to for one or multiple sheets copied from an original job sheet(s) or an electronic document page image, from a particular user, or otherwise related. According to systems and methods herein, a "job" can be a print job, a copy job, a scan job, etc.

An "original image" or "input image" is used herein to mean an electronic (e.g., digital) recording of information. The original image may include image data in the form of text, graphics, or bitmaps.

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space, such as $L*a*b*$, using, for instance, an RGB-to-$L*a*b*$ converter to obtain luminance ($L*$) and chrominance ($a*b*$) values. It should be appreciated that pixels may be represented by values other than RGB or $L*a*b*$.

The $L*a*b*$ color space has an L dimension for lightness and a and b that are color-opponent dimensions (i.e., chrominance), and are based on nonlinearly compressed coordinates. The $L*a*b*$ color space includes all perceivable colors, which means that its gamut exceeds those of the RGB and CMYK color spaces, but the $L*a*b*$-color space is device independent, which means that the colors are defined independent of their nature of creation or the device on which they are output (displayed or rendered).

FIG. 1 illustrates an exemplary image processing device 10. The image processing device includes an image adjustment unit 12 and optionally an image output device 14. The image adjustment unit 12 receives an original digital image 16, such as a scanned image, in a first (input) color space, such as RGB. The image adjustment unit 12 converts the original image 16 to a second color space, in particular, a luminance-chrominance color space, such as L*a*b*, in which image adjustments are made to form an adjusted digital image 18. The adjustments include background adjustment, as needed. The image adjustment unit 12 may convert the adjusted digital image 18 to an output digital image 20 in a third (output) color space, in which the output device 14 operates, such as CMYK. The exemplary output device 14 includes a marking device which renders the output digital image 20 on print media, using marking materials, such as inks or toners, to form a rendered (generally, hardcopy) image 22. The image processing device 10 may further include or be communicatively connected with a source 24 of original digital images, such as a scanner or computing device. In some embodiments, such as a scan-to-copy image processing path, the output image 20 may be stored in local or remote memory, such as in the source 24 of digital images. Components 12, 14, 24 of the image processing device 10 may be communicatively connected by wired or wireless links 26, 28, such as wires, a local area network, or a wide area network, such as the Internet.

The image adjustment unit 12 includes main memory 30 which stores software instructions 32 for performing the processing steps that generate the adjusted image 18 and output image 20. A processor 34, in communication with the memory 30, executes the instructions. The image adjustment unit 12 also includes one or more input/output (I/O) devices 36, 38 for receiving original images 16 and outputting the output images 20. Hardware components 30, 34, 36, 38 of the image correction unit 12 may communicate via a data/control bus 40.

The image adjustment unit 12 may include one or more computing devices, such as a microprocessor, a PC, such as a desktop, laptop, or palmtop computer, portable digital assistant (PDA), server computer, cellular telephone, tablet computer, combination thereof, or other computing device capable of executing instructions for performing the exemplary method.

The memory 30 may represent any type of non-transitory computer readable medium such as random-access memory (RAM), read only memory (ROM), magnetic disk or tape, optical disk, flash memory, or holographic memory. In one embodiment, the memory 30 comprises a combination of random-access memory and read only memory. In some embodiments, the processor 34 and memory 30 may be combined in a single chip. Memory 30 stores instructions for performing the exemplary method as well as the processed data.

The input/output (I/O) devices 36, 38 allow the image adjustment unit 12 to communicate with other devices via a computer network, such as a local area network (LAN) or wide area network (WAN), or the internet, and may comprise a modulator/demodulator (MODEM) a router, a cable, and/or Ethernet port.

The digital processor device 34 can be variously embodied, such as by a single-core processor, a dual-core processor (or more generally by a multiple-core processor), a digital processor and cooperating math coprocessor, a digital controller, or the like. The digital processor 34, in addition to executing instructions 32 may also control the operation of the output device 14. In one embodiment, the processor may be or include a special purpose processor that is specialized for processing image data and may include application-specific integrated circuits (ASICs) that are specialized for the handling of image processing operations, processing image data, calculating pixel values, and the like. The processor may include a raster image processor (RIP), which uses the original image description to RIP the job. Accordingly, for a print job, the print instruction data is converted to a printer-readable language. The print job description is generally used to generate a ready-to-print file. The ready-to-print file may be a compressed file that can be repeatedly accessed for multiple (and subsequent) passes.

The term "software instructions" or simply "instructions," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 32 include a first (input image) conversion component 50, optionally one or more image preprocessing components 52, a background adjustment component 54, optionally, an edge detection and enhancement component 56, optionally one or more image postprocessing components 58, a second (adjusted image) conversion component 60, an image output component 62, and an optional parameter learning component 64. As will be appreciated, one or more of components 50, 52, 54, 56, 58, 60, 62, 64 may be separate or combined and may be software or hardware components.

Figure 2:
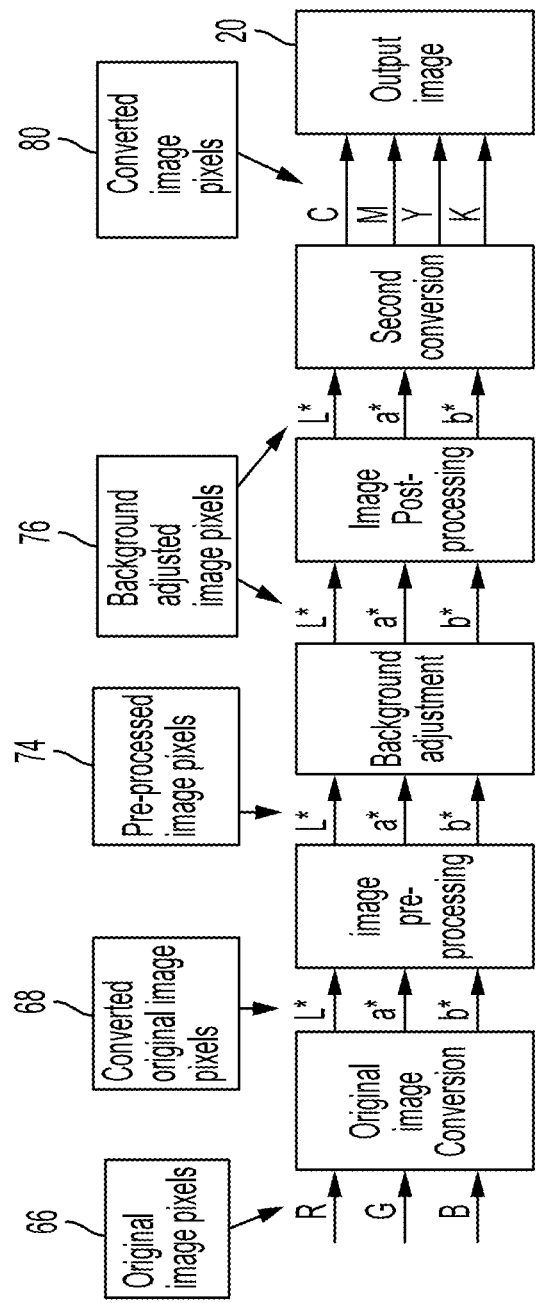
FIG. 2 is a flow chart which illustrates a software image processing path in accordance with another aspect of the exemplary embodiment.

Briefly, with reference also to FIG. 2, the first conversion component 50 receives the original image 16 in the first color space and converts the pixels 66 of the original image 16 to pixels 68 forming a converted image 70 (FIG. 1) in the second color space. This is illustrated in FIG. 2 by conversion from RGB to L*a*b*. As will be appreciated, if the original image 16 is already in the second color space, the first conversion component 50 may be omitted. The conversion may be performed with a look-up table or using other methods, such as using appropriate conversion equations.

The optional image preprocessing component(s) 52 may perform various preprocessing operations on the converted image pixels 68 in the second color space. These operations may include one or more of cropping, scaling, padding, and the like. As will be appreciated, one or more of these operations may additionally or alternatively be performed later in the software image path. The output of the preprocessing is an optionally preprocessed image 72 containing preprocessed image pixels 74 in the second color space.

The background adjustment component 54 segments the image and applies a variable background adjustment to the pixels 74. The output of the background adjustment operation is background-adjusted image pixels 76, i.e., pixels of a background-adjusted image 78, some of which have been adjusted with the objective of providing improved image quality.

The optional edge enhancement component 56 and/or other image postprocessing component(s) 58 may perform various preprocessing operations on the pixels of the background-adjusted image 78 in the modified second color space to form an adjusted image 18. Where no postprocessing is performed, the background-adjusted image 78 serves as the adjusted image 18.

The second conversion component 60 converts the adjusted image 18 to pixels 80 of an output image 20 in the third color space, such as CMYK.

The images 16, 18, 20, 70, 72, 78 may be temporarily stored in memory 30, or in a separate memory, during processing.

The image output component 62 outputs the output image 20 to the image output device 14, e.g., via the I/O device 38. Alternatively, the output image may be stored in memory.

During the image processing described herein, the original image may be converted to a bit mapped image indicating a value to print at each pixel of the image.

The optional parameter learning component 64 learns one or more parameters of the system, such as look up tables, scalar parameters, and the like.

Figure 3:
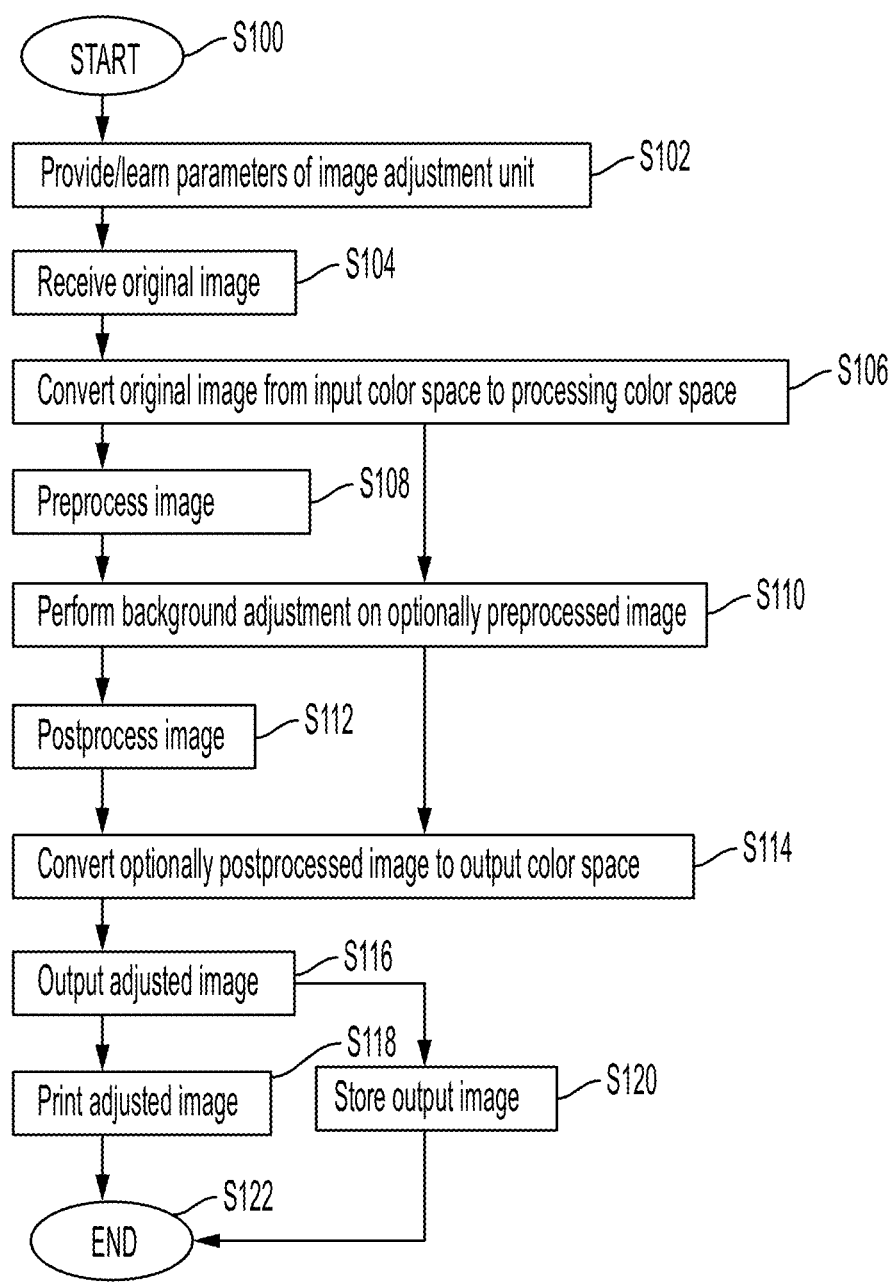
FIG. 3 is a flow diagram of a method for image adjustment in accordance with another aspect of the exemplary embodiment.

FIG. 3 illustrates an image processing method which may be performed with the device of FIG. 1. The method begins at S100.

At S102, parameters of the adjustment unit are provided. This may include learning and/or setting parameters of LUTs (or other suitable data structures which are referred to generally as LUTs) and other parameters, as described further below.

At S104, an original image, such a scanned image of a hardcopy document, is received, and may be stored in memory.

At S106, the original image is converted to a suitable color space for processing.

At S108, the converted image may be preprocessed in one or more preprocessing operations.

At S110, background adjustment is performed on the optionally preprocessed, image. Further details on the background adjustment step are described below, with reference to FIG. 10.

At S112, the background-adjusted image may be post-processed in one or more post-processing operations.

At S114, the background-adjusted, optionally post-processed image is converted to an output image in an output device color space, such as CMYK (for a printer), RGB (for a color monitor).

At S116, the output image is output.

At S118, the output image may be rendered in hardcopy form, by printing. Alternatively, or additionally, at S120, the output image may be stored in memory, e.g., for later viewing on a screen, or for subsequent processing.

The method ends at S122.

Figure 4:
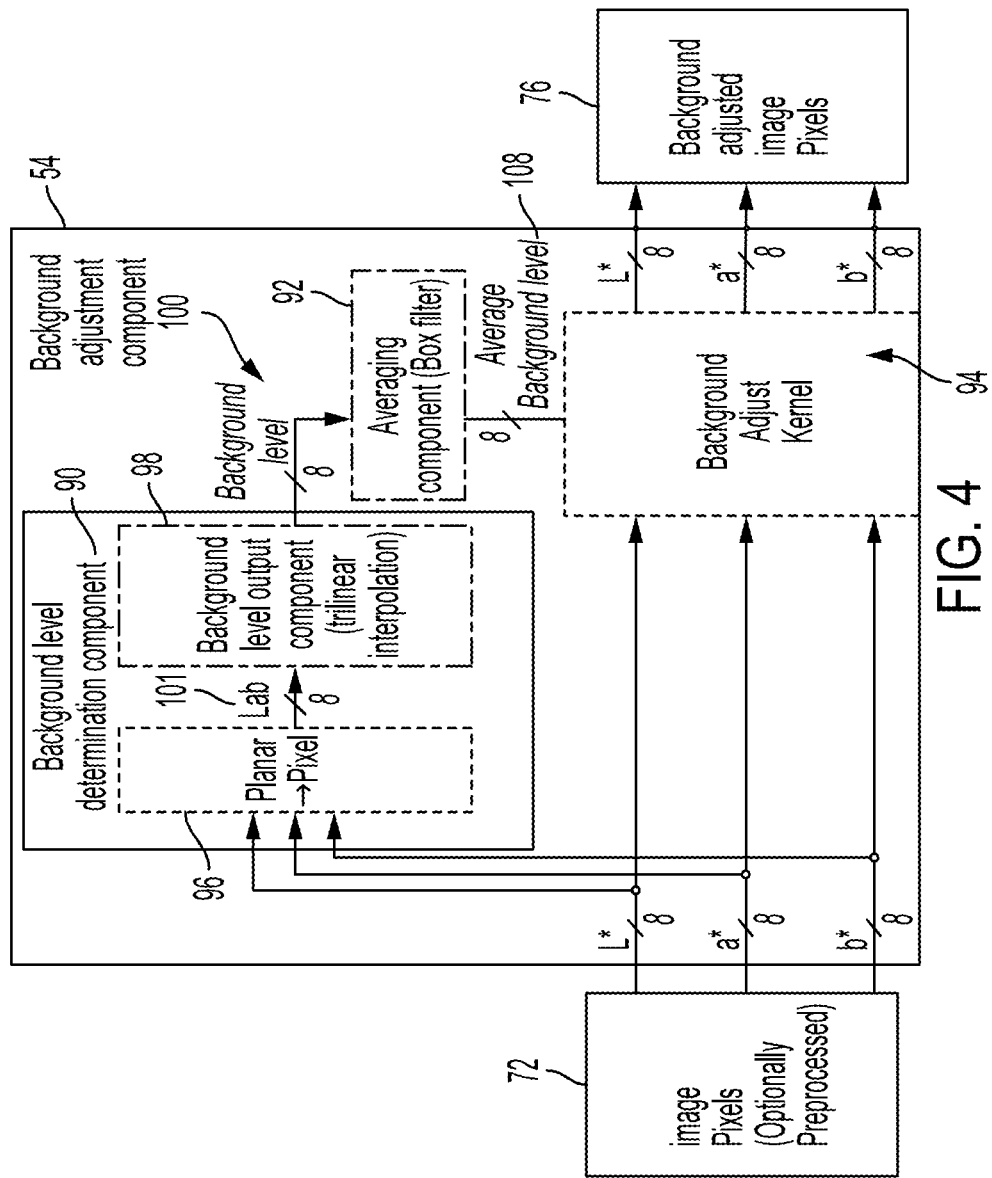
FIG. 4 illustrates one embodiment of a background adjustment component in the device of FIG. 1.

With reference to FIG. 4, an exemplary background adjustment component 54 is illustrated. The illustrated inputs to component 54 are 8 bbp for each channel, i.e., L*, a*, b* values, each of which are a sequence of 8 bits in which each bit can be 0 or 1, corresponding to a range of 0-255. However, other scales are contemplated.

The background adjustment component 54 includes a background level determination component 90, an averaging component 92, and a background adjust kernel 94. Component 90 includes a planar to pixel aggregation component 96 and a background level output component 98, which may operate through trilinear interpolation. The two components 96, 98 may be fused as a single component.

The background level determination component 90 outputs a background level 100, which is essentially a probability that a given pixel is a background pixel. In the exemplary embodiment, a first pixel with an L* value which is closer to 0 on a scale of 0-255 (i.e., black) than a second pixel receives a higher background level value than the second pixel, assuming the a* and b* values of the two pixels are the same.

In the illustrated embodiment, the background level 100 is an 8 bit output, i.e., each pixel has a background level of from 0 to 255 on a decimal scale, although this could alternatively be on a scale of 0-1 or 0-100. The determination is made for each pixel, and is a function of its L*, a*, and b* values, without reference to surrounding pixels.

In the illustrated embodiment, the aggregation component 96 concatenates the input L*, a*, and b* values into a single Lab channel value 101 for ease of computation. The output is a sequence of 24 bits composed of the L*, a*, and b* bit sequences. For example, if the L*, a*, and b* values are (1,0,0,0,0,1,0,0), (0,0,0,0,0,1,0,1), and (0,0,0,0,0,0,0,0,1), aggregation component outputs (1,0,0,0,0,1,0,0,0,0,0,0,0,0,1, 0,1,0,0,0,0,0,0,0,0,1) as the Lab value 102.

The background level output component 98 receives the Lab value 101 and outputs the background level 100 as a function thereof. The background level output component 98 functions essentially as a look up table (LUT). To reduce memory requirements, trilinear interpolation may be used. In this embodiment, the most significant bits are used to access lattice points within the 3D color gamut (which form eight points of a cube around an interpolation point corresponding to the pixel). The number of significant bits used may be selected to provide a tradeoff between image quality and computing time. The lattice points are each associated, in the LUT, with a respective background level. Interpolation is then performed to determine the background level for the pixel. In the exemplary embodiment, trilinear interpolation is performed in the X,Y,Z color space, but other color spaces are contemplated. In one embodiment, the trilinear interpolation LUT includes 3,375 lattice point integer values (i.e., a 15×15×15 LUT), although smaller or larger LUTs are contemplated. As will be appreciated if memory size is not constrained, interpolation could be replaced with a larger LUT, which possibly may achieve a slightly higher image quality.

Figure 5A:
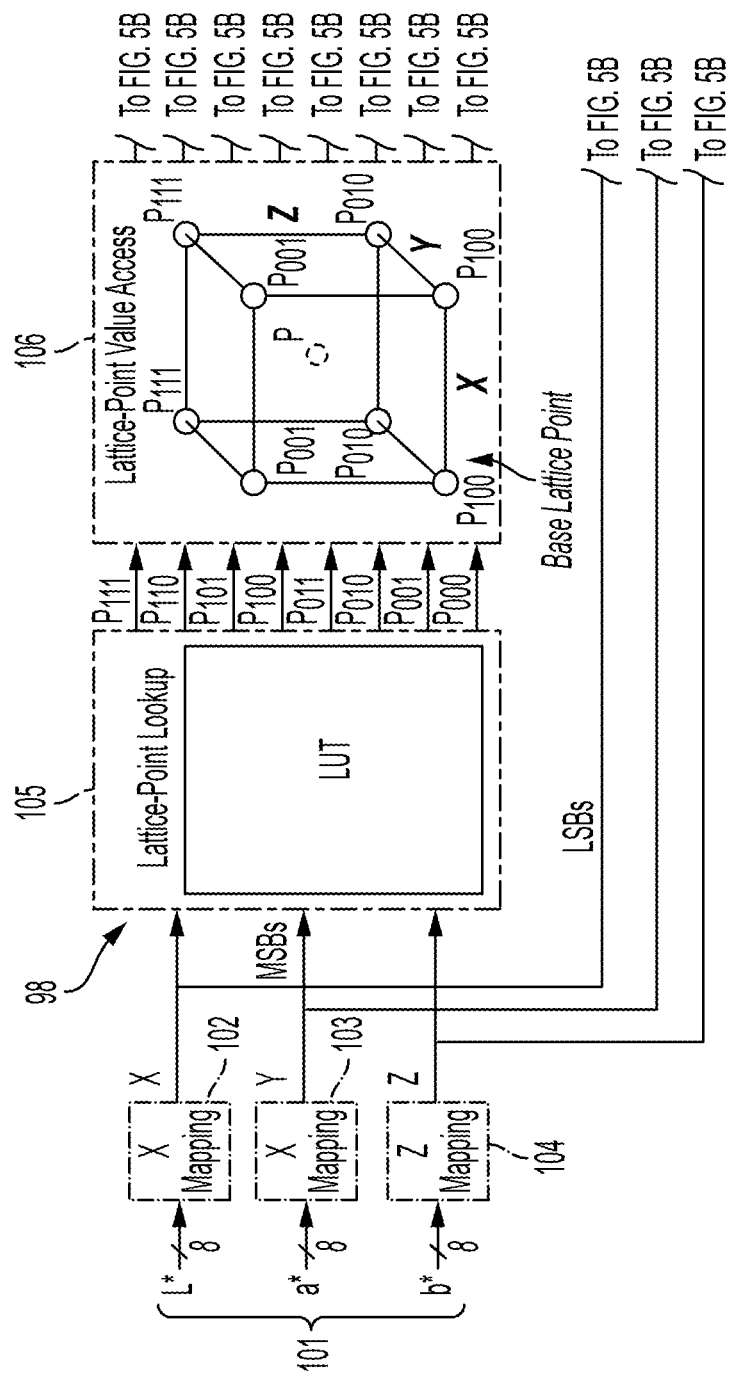
FIG. 5, which is split into FIGS. 5A and 5B for ease of illustration, illustrates background level determination by trilinear interpolation.
Figure 5B:
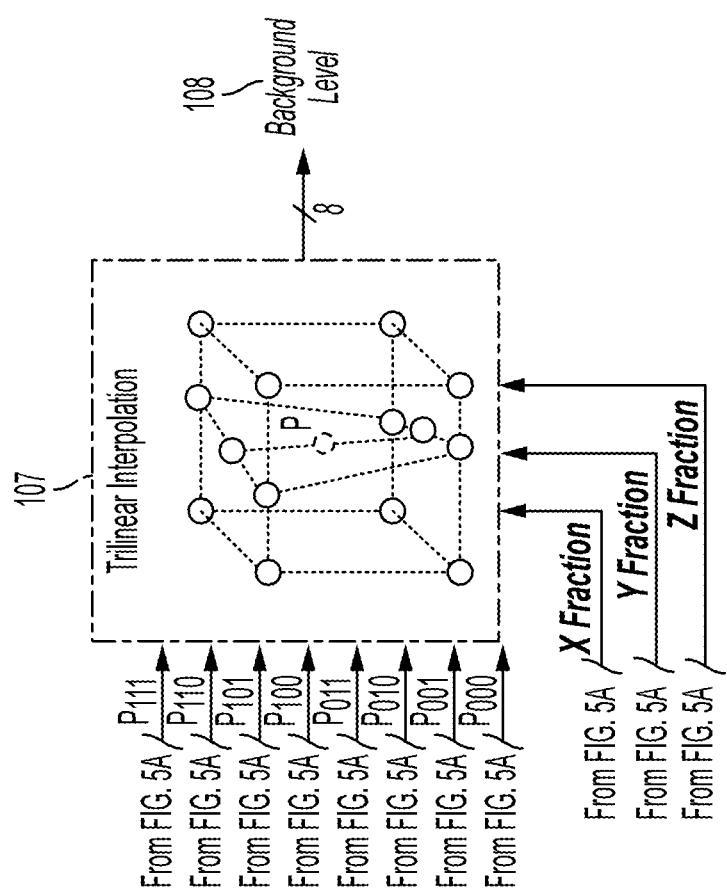

FIG. 5 graphically illustrates the operation of an exemplary background level output component 98. The L*a*b* values are mapped to corresponding CIE XYZ tristimulus values using respective mapping LUTs 102, 103, 104. The XYZ values, defined on orthogonal axes, are input to a lattice point LUT 105, which identifies the eight closest lattice points 106, denoted $P_{111}, P_{110}, P_{101}, P_{100}, P_{011}, P_{010}, P_{0001}, P_{000}$. A trilinear interpolation kernel 107 computes the Euclidean distance from the pixel P to each lattice point. As illustrated, this includes generating a path from the pixel to the lattice point using the 3 perpendicular X, Y, Z axes and computing the Euclidean distance (shortest path) therefrom. The background level output is then a function of the background levels assigned to each of the lattice points as an inverse function of the Euclidean distance, e.g.:

$$\text{Background level} = \left(\frac{BL1}{D1} + \frac{BL2}{D2} + \frac{BL3}{D3} + \frac{BL4}{D4} + \frac{BL5}{D5} + \frac{BL6}{D6} + \frac{BL7}{D7} + \frac{BL8}{D8}\right)$$

where BL1-BL8 are the background levels assigned to the eight lattice points (stored in LUT 105) and D1-D8 are the corresponding calculated Euclidean distances (normalized so that they sum to 1).

The trilinear interpolation component 98 provides a flexible and robust method in which to program the input remapping LUTs 102, 103, 104 and 3D lattice points 106 to determine which L*a*b* triplet values or color gamut regions should be classified as "background" pixels.

The LUTs 102, 103, 104, 105 (FIG. 5), used by the background level output component 98 may be generated to optimize image quality given a set of images of the type to be processed. In one embodiment, two or more LUT's 105 may be stored and the user provided with the option to select one of the stored LUTs, based on personal preference.

The optional averaging component 92 (FIG. 4) adjusts the background level 100 of a given pixel, output by the background level determination component 90, to take into account the background levels 100 of a set of local (e.g., surrounding) pixels. The component 92 outputs, for each pixel of the image, an average background level 108. This provides the ability to segment relatively low-frequency halftone screens/regions that would otherwise be classified simply as background. Taking into account the attributes of neighboring pixels can reduce the abrupt segmentation switching artifacts that could otherwise occur in a purely point process classification scheme.

In one embodiment, the average background level is the average of 9 pixels forming a box with the given pixel as the central pixel, with the eight nearest surrounding pixels. In other embodiments, a larger number of surrounding pixels may be considered. In some embodiments, different weights may be applied to surrounding pixels, e.g., depending on their closeness to the given pixel. The averaging component 92 can be any suitable box filter, such as a 3×3, 5×5, or 7×7 box filter. The result of the averaging is that the background level of the given pixel is shifted closer to that of the surrounding pixels.

The background adjust kernel 94 (FIG. 4) takes as input the original (or preprocessed) L*, a*, b* values for each of the image pixels 72 and applies a background adjustment, which is a function of the background level 100 (or 108, if computed). Pixels with a high background level 100 (or 108) receive a greater adjustment than pixels with a relatively lower background level 100 (or 108).

The aim of the background adjust kernel 94 is to process potential background pixels in a variable manner in order to avoid/minimize the abrupt switching artifacts that are typically generated in many threshold-based segmentation classification algorithms. In other words, the extent in which any background pixels are driven toward "pure white" (i.e., $L^*a^*b^*=255, 128, 128$, respectively) is based upon the neutral strength of the pixel in question as opposed to being fully labeled/classified as "background" versus "non-background". This is graphically illustrated in FIG. 6, where the arrows 110, 112, 114 indicate the extent to which three illustrative pixels, denoted $Pixel_A$, $Pixel_B$, and $Pixel_C$, are moved towards pure white. $Pixel_A$ is shifted more than $Pixel_B$ and $Pixel_C$, due to the a*b* components being closer to the L* neutral axis. Similarly, $Pixel_B$ is adjusted more toward pure white than $Pixel_C$, due to the a*b* components being closer to the L* neutral axis. In addition to moving closer to the L* axis, the pixels' a*b* values are also shifted towards neutral values (128, 128), with $Pixel_A$ being shifted more than $Pixel_B$ and $Pixel_C$.

Figure 6:
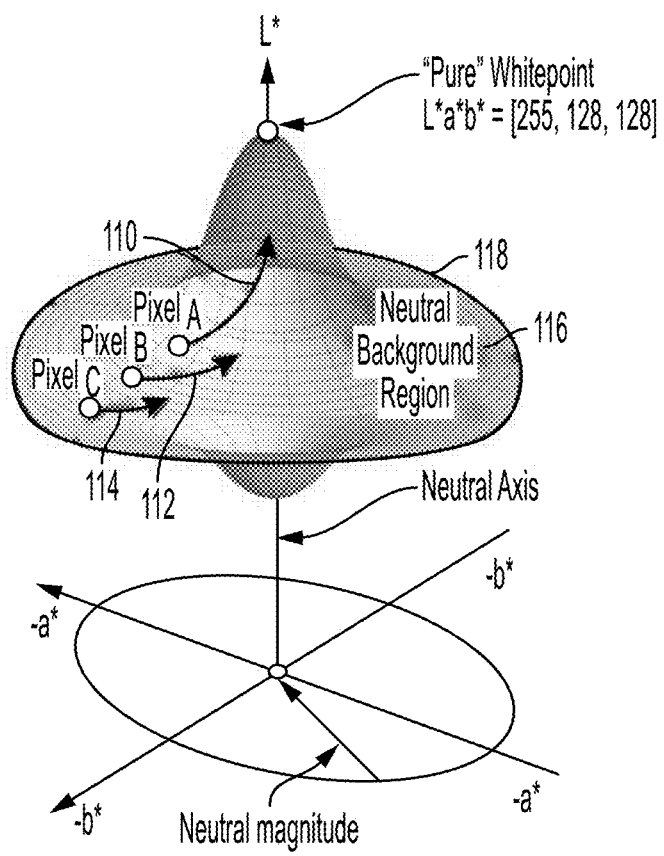
FIG. 6 graphically illustrates changes to image pixels during background adjustment in the exemplary method.

A background (neutral) region 116 of the L*a*b* color gamut shown in FIG. 6 is defined and generated by appropriately programming the trilinear interpolation lattice points and input remapping LUTs to encompass whatever regions of the L*a*b* gamut are to be classified as background. The remaining parts of the color gamut are considered to be foreground. A circumference 118 of the background region defines the border between neutral background pixels and foreground image pixels. Pixels whose values are on or within the border 118 are candidates for adjustment (i.e., they may be adjusted, but not necessarily, while those outside the border receive no adjustment). In this example, the background region 116 of the color gamut is circular and centered around the a*b* neutral axis on the lighter regions of the L*axis. This is suitable for the majority of documents that are scanned in practice. However, for a copy printed on yellow colored paper stock, for example, the background region 116 could be contained and programmed within the yellow L*a*b* region(s) so that further adjustments to those (yellow background) pixels could be realized using the same variable processing method. The degree of background adjustment can thus be adjusted, based upon customer preference and/or other factors (such as reduced toner usage). For example, for a highly chromatic "yellow paper" copy the background can be suppressed to achieve a much lighter yellow hue in order to maintain at least some of the background content of the original print. Alternatively, the yellow background region could be eliminated while still maintaining the full integrity of the print content. By providing the ability to change/program the "pure white" L*a*b* values used to derive the delta values to other pixel settings can be used to achieve a similar, but different background adjustment effect. For example, to create a light pink background from a white background, a delta based upon its L*a*b* (pink) value can be created.

Figure 7:
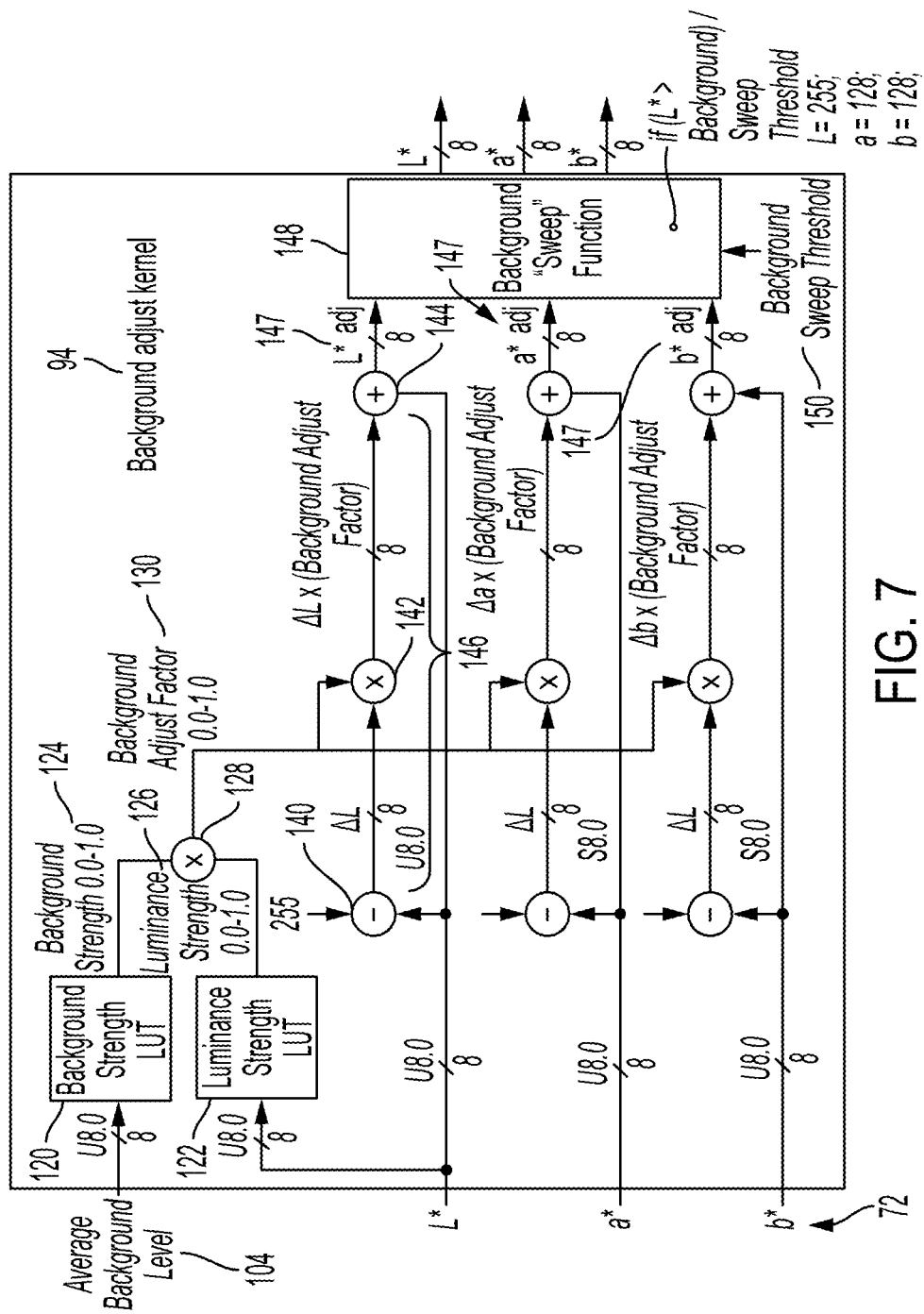
FIG. 7 is a schematic block diagram of a background adjust kernel for the background adjustment component of FIG. 4, in accordance with one aspect of the exemplary embodiment.

FIG. 7 is a functional block diagram of one embodiment of the background adjust kernel 94 of FIG. 4, that processes the incoming L*a*b* image. The kernel 94 includes a background strength LUT 120 and a luminance strength LUT 122. The background strength LUT 120 converts the average background level 108 to a background strength 124 according to a first non-linear function. The luminance strength LUT 122 converts the L* value of the pixel to a luminance strength 126 according to a second non-linear function. In an example embodiment, the luminance and background strength LUTs 120, 122 are each 256-element, floating-point LUTs. Briefly, the background adjust kernel 94 processes and segments the incoming L*a*b* image by considering both the average background and incoming L* values and subsequently applies a programmable multiplication factor 128 which is based upon the pixel's background strength 124 and its luminance strength 126.

Figure 8:
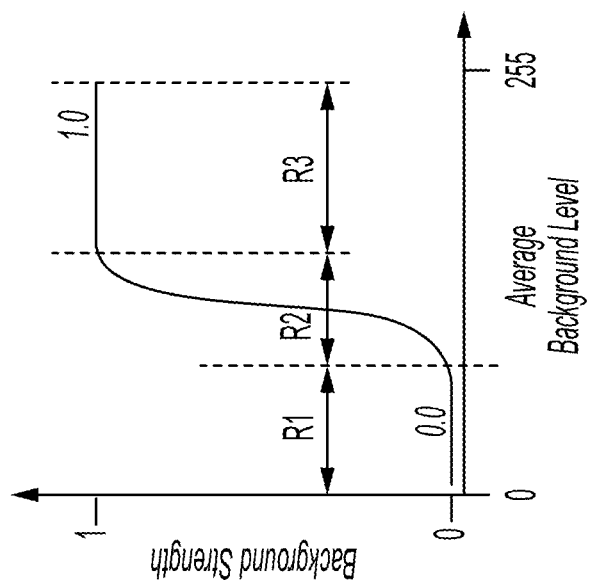
FIG. 8 illustrates an exemplary conversion function for computing background strength of a pixel.

FIG. 8 illustrates an example first non-linear function which may be applied by LUT 120. For a first range R1 of background levels, e.g., from 0-90 on a scale of 0-255, i.e., where there is a very low probability that the pixel is background, the background strength 124 is set to 0 (or a very low value close to 0), on a scale of 0-1. For a second range R2 of background levels, e.g., from 90-220 on a scale of 0-255, i.e., where there is a moderate probability that the pixel is background, the background strength increases with increasing background level, e.g., exponentially up to the maximum background strength (1 in the exemplary embodiment). All pixels in a third region R3, e.g., with an average background level of from 220 to 255, are automatically assigned the maximum background strength of 1. As will be appreciated, the three ranges are adjustable and fewer or more than 3 ranges may be used. In other embodiments, different functions may be applied.

Figure 9:
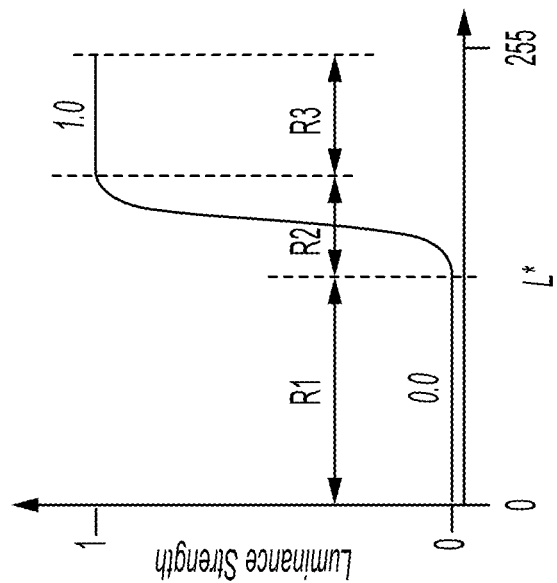
FIG. 9 illustrates an exemplary conversion function for computing luminance strength of a pixel.

FIG. 9 illustrates an example second non-linear function which may be applied by LUT 122. For a first range R1 of L* values, e.g., from 0-120 on a scale of 0-255, i.e., where there is a very low probability that the pixel is background, the luminance strength 126 is set to 0 (or a very low value close to 0), on a scale of 0-1. For a second range R2 of L* values, e.g., from 120-240 on a scale of 0-255, i.e., where there is a moderate probability that the pixel is background, the luminance strength increases with increasing L* value, e.g., exponentially up to the maximum background strength (1 in the exemplary embodiment). All pixels in a third region R3, e.g., with an L* value of from 220 to 255, are automatically assigned the maximum luminance strength of 1. As will be appreciated, the three ranges are adjustable. In other embodiments, different functions may be applied. In the following, it is assumed that each of the background and luminance strength 256-element LUTs has an output floating-point range between 0.0 to 1.0.

As illustrated in FIG. 7, an aggregating function 128 aggregates the output background strength 124 and luminance strength 126 to generate a background adjust factor 130. The background adjust factor 130 is thus a function of the background strength 124 and luminance strength 126. In one embodiment, the aggregating function 128 is a multiplication function such that the background adjust factor 130 is the product of the background strength 124 and luminance strength 126. As a result, when at least one of the background strength 124 and luminance strength 126 is 0, the background adjust factor 130 is 0 and when both of the background strength 124 and luminance strength 126 are non-0, the background adjust factor 130 is greater than 0 and has a maximum value of 1. Each of the background and luminance strength 256-element LUTs 120, 122 have an output floating-point range between 0.0 to 1.0, which are multiplied together to form the composite Background Adjust Factor value 130.

The background adjustment factor 130 is employed by a luminance adjust function 132 to adjust the L* value of the pixel and by corresponding chroma adjust functions 134, 136 to adjust the a* and b* values, respectively. For example, as illustrated in FIG. 7, a ΔL is computed by subtracting the input L* value from the maximum L* value ($L^*_{max}$) of 255, as illustrated at 140. ΔL is multiplied by the background adjust factor as illustrated at 142, and the result is added to the input luminance value L* at 144 to generate an adjusted L* value, denoted $L^*_{adj}$. As will be appreciated, a single computation could be used to compute $L^*_{adj}$:

$$L^*_{adj} = L^* + [(L^*_{max} - L^*) \times B] \qquad (1)$$

where B represents the background adjust factor.

Similarly, the same background adjust factor is used to compute adjusted chrominance values $a^*_{adj}$, $b^*_{adj}$, where $a^*_{max}$ and $b^*_{max}$ are both 128:

$$a^*_{adj} = a^* + [(a^*_{max} - a^*) \times B] \qquad (2)$$

$$b^*_{adj} = b^* + [(b^*_{max} - b^*) \times B] \qquad (3)$$

As an example, if B is 0.9, and the input L*, a*, and b* values are (240, 123, 127), the three adjusted values 147 are (254, 128, 128), i.e., closer to pure white but not exactly pure white. When B is lower (a lower probability of being a background pixel), the adjustment will be less.

In the exemplary embodiment, the delta values ΔL*, Δa* and Δb* are determined as the cartesian distance to pure white (255, 128, 128), although another point in the color gamut could be selected.

In summary, if the background strength 124 and luminance strength 126 are sufficiently high (based upon the LUT profiles), the pixel's composite background adjust value(s) 147 will be close to or exactly equal to "1.0", which would apply the maximum delta value to each L*a*b* component, thereby forcing the pixel to a pure white value. If the pixel falls outside the "background" region or gamut as defined and derived within the programmable trilinear lattice point tables, the pixel's composite background adjust value will be equal to "0.0", which would effectively pass the incoming L*a*b* pixel values unmodified to the output. On the other hand, if a pixel happens to fall in close proximity or within the boundary between "background" and "non-background" regions, the composite background adjust range will vary between 0.0 and 1.0, thereby adjusting the pixel's L*a*b* value based upon the "neutrality" of the incoming pixel. In effect, this neutralizes pixels classified as background and dynamically adjusts their L*a*b* values toward pure white in a variable manner in order to avoid and minimize the abrupt switching artifacts that are traditionally problematic in threshold-based segmentation algorithms.

The background adjust kernel 94 optionally includes a background sweep function 148 (FIG. 7). The sweep function 148 applies a sweep threshold 150 to the adjusted L* value ($L^*_{adj}$). If $L^*_{adj}$ exceeds the threshold 150, the pixel's L*, a* and b* values are set to pure white (255, 128, 128). The threshold 150 may be programmable, e.g., by a user. For example, the user may be permitted to select between two or more values for the threshold. The threshold 150 (or at least one of a set of programmable thresholds) is generally close to 255, but not so low that all pixels with a background adjust factor 130 of less than 1.0 are automatically assigned to pure white. Having a sweep function is useful in that it ensures that the a* and b* values are constrained to the same white point above a certain $L^*_{adj}$ value.

The ($L^*_{adj}$, $a^*_{adj}$, $b^*_{adj}$) values for each pixel, as optionally modified by the sweep function 148, are output from the background adjustment component 54, as illustrated at 76 in FIG. 4, and input to the postprocessing component(s) 58, if any.

In the exemplary embodiment, all pixels of the image are processed by the background adjustment component 54. However, it is also contemplated that such processing could be limited to pixels in a region or regions of the image that together occupy less than the entire image, such as a border region of the image or a text region of the image. In one embodiment, identifying candidate background regions for processing by the background adjustment component 54 could be performed by a background detection kernel (not shown), upstream of the background adjustment component.

Figure 10:
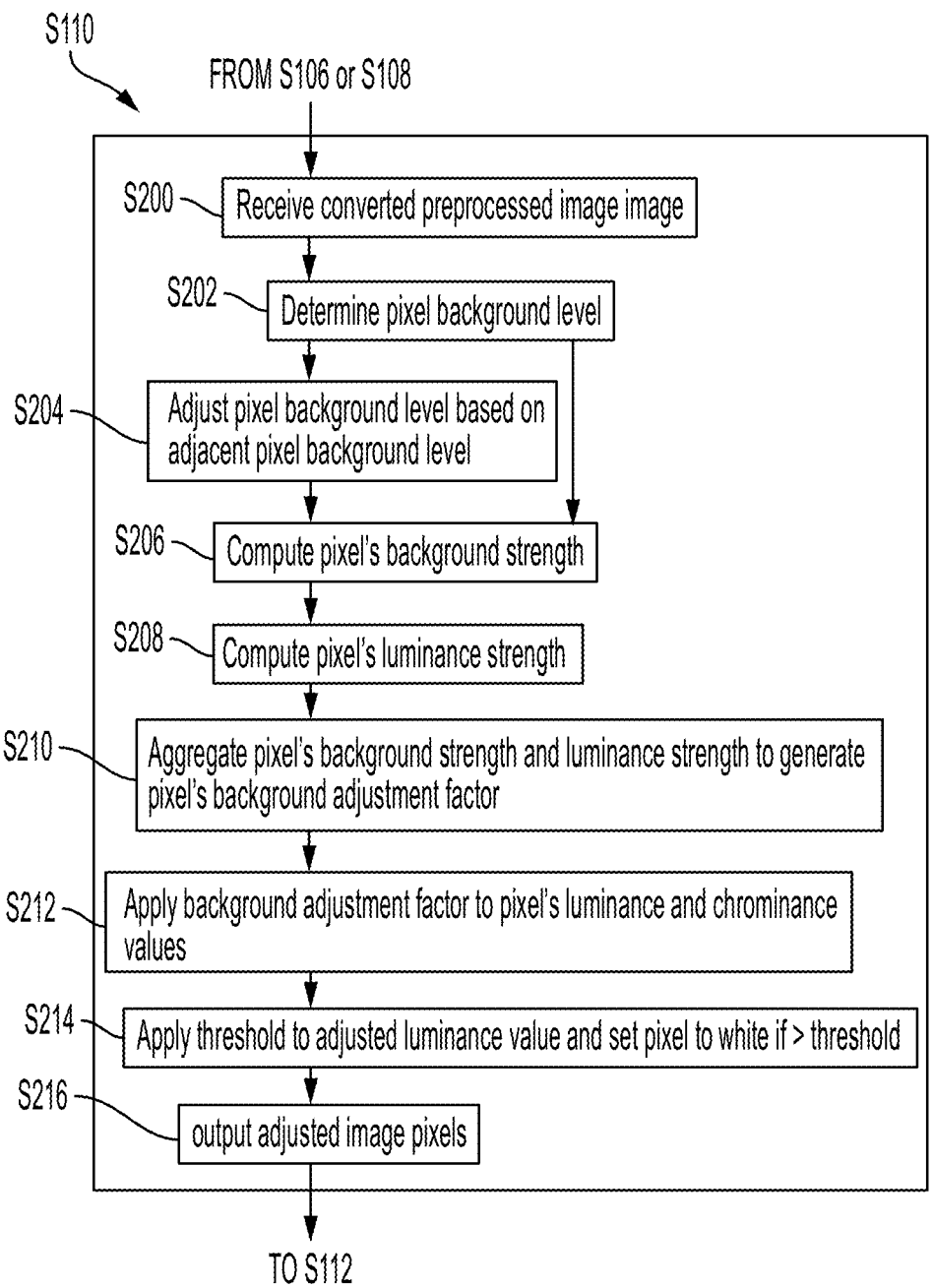
FIG. 10 is a flowchart illustrating background adjustment in the method of FIG. 3.

With reference to FIG. 10, a flowchart summarizing the background adjustment process of S110 of FIG. 3 is shown.

At S200, the pixels 72 forming the entire converted and optionally preprocessed image 74 are received (or at least of a region thereof).

At S202, a background level 100 is determined for each pixel, as a function of the input L*, a*, b* values received at S200. The background level 100 may be the output of the trilinear interpolation kernel and can be thought of as an 8 bpp tag which indicates the "neutrality" of a pixel.

At S204, the background level 100 for each pixel may be adjusted by applying a box filter 92 or other averaging method to provide an average background level 108.

At S206, a background strength 124 is computed for each pixel, as a non-linear function of the optionally averaged background level 100 or 108.

At S208, a luminance strength 126 is computed for each pixel, as a non-linear function of the pixel's L* value, received at S200.

At S210, a background adjustment factor 130 is computed for each pixel, as a function of the computed background strength 124 and luminance strength 126.

At S212, for each pixel, the background adjustment factor 130 is used by an adjustment function 146, to adjust the input L*, a*, b* values received at S202. The adjustment increases the L*, a*, b* values to generate respective $L^*_{adj}$, $a^*_{adj}$, $b^*_{adj}$ values in a variable manner, which is a function of the background strength 124 and luminance strength 126. Thus, at least some pixels vary in the amount the adjustment that they receive.

In another embodiment, rather than performing steps S210 and S212, the computed background strength 124 and luminance strength 126 could be each applied to the pixel's L*, a*, b* values and the results combined to produce the adjusted values.

At S214, for each pixel, a threshold 150 may be applied to the $L^*_{adj}$ value. Pixels whose $L^*_{adj}$ value exceeds the threshold are adjusted to a fixed L*, a*, b* value, such as pure white.

At S216, the background-adjusted image pixels are output for optional postprocessing and conversion to the rendering color space.

The method illustrated in FIGS. 3 and 10 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the image adjustment unit 12 (for example, an internal hard drive of RAM), or may be separate (for example, an external hard drive operatively connected with the unit 12), or may be separate and accessed via a digital data network such as a local area network (LAN) or the Internet (for example, as a redundant array of inexpensive or independent disks (RAID) or other network server storage that is indirectly accessed by the unit 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 3 and/or 10, can be used to implement the method for image adjustment. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further aspects of the system and method will now be described.

Background Adjustment Parameter Tuning and Optimization

As discussed above, various LUTs and adjustment parameters are used in the exemplary system, which can be programmed and adjusted to optimize results for a particular printer, paper type, and/or colorants used.

A pixel's neutral magnitude can be derived from Equation (1):

$$\text{Neutral magnitude} = \text{maximum of 0 and } \sqrt{\text{Max}_a^2 + \text{Max}_b^2} - \sqrt{a^2 + b^2} \quad (1).$$

or a function thereof. i.e., when the value is less than 0, it is set to 0.

$\text{Max}_a$ and $\text{Max}_b$ are the maximum absolute a* and b* values which define a neutral boundary 116 (FIG. 6) between background and non-background regions of the L*a*b* gamut.

For example, the $\text{Max}_a$ and $\text{Max}_b$ a* and b* pixel values may be defined within a +/−14 range around the neutral axis in order to provide sufficient neutral background detection for most customer paper stock/media applications. In one embodiment, $\text{Max}_a = \text{Max}_b$.

Figure 11A:
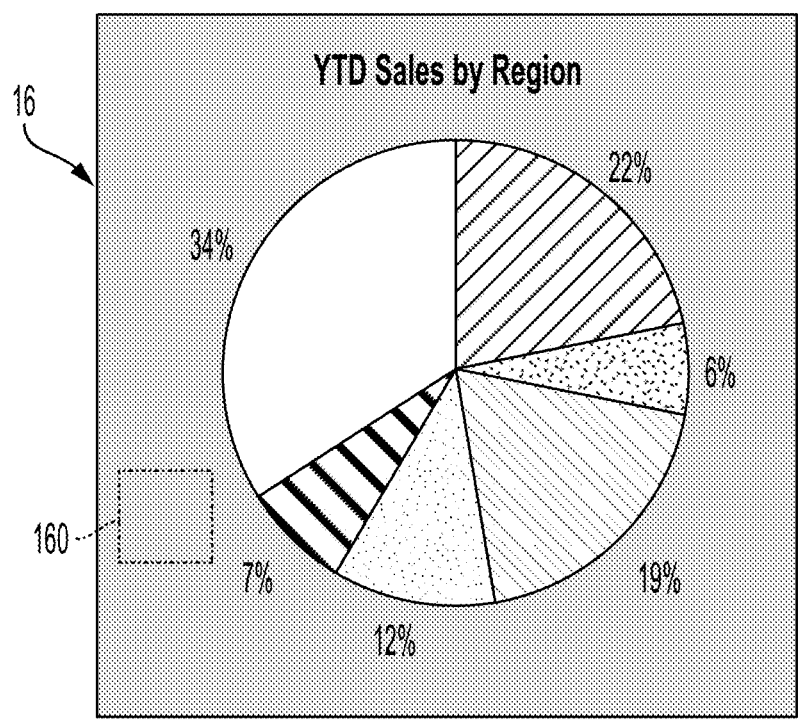
FIG. 11, which is split into FIGS. 11A and 11B for ease of illustration, illustrates a neutral histogram generated for a background patch of an image prior to background adjustment.
Figure 11B:
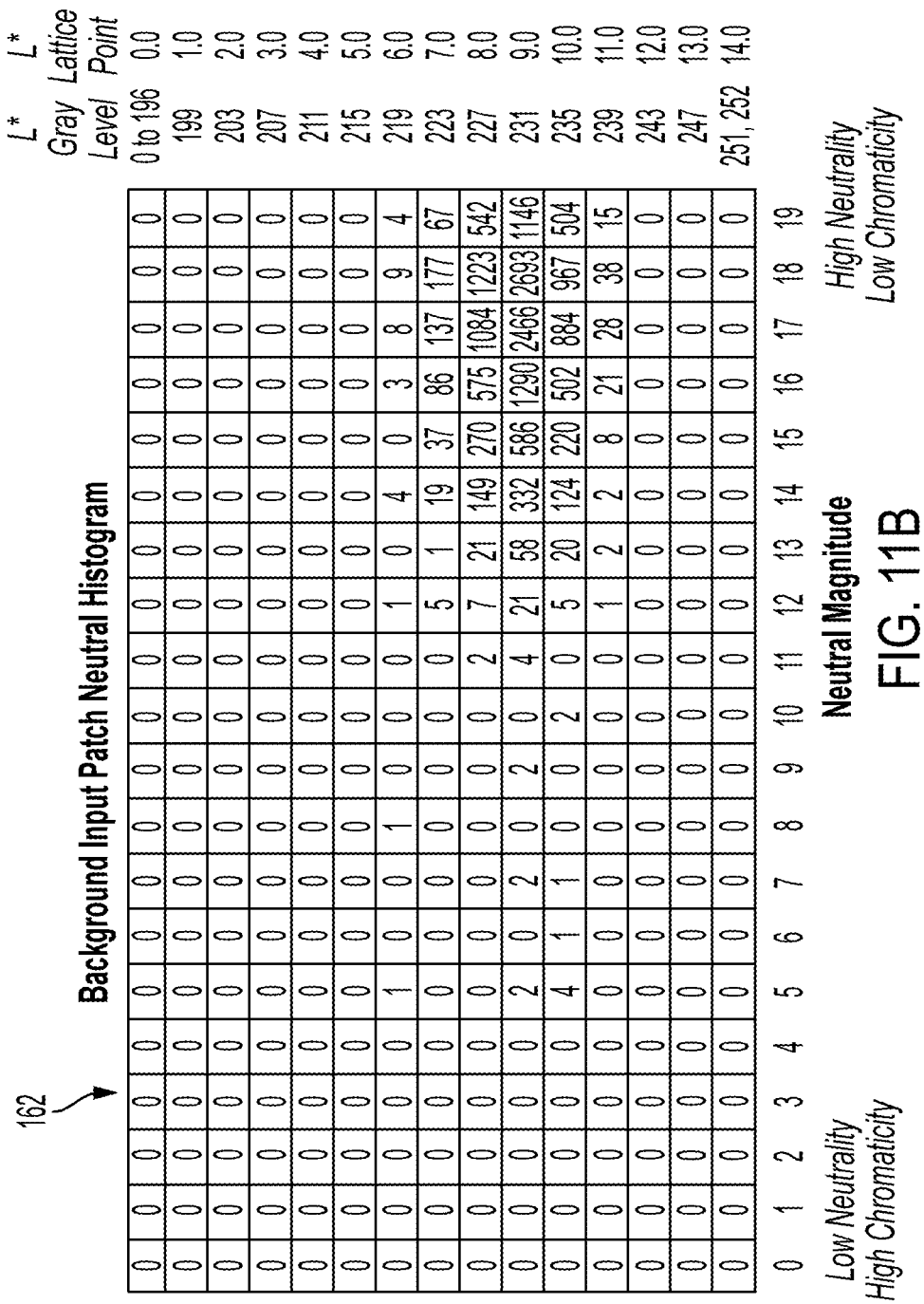

As illustrated in FIG. 11, a background patch 160 in a scanned document page 16 can be processed via the above calculation for each pixel contained within that region. A 2-dimensional patch histogram 162 can then be generated in order to evaluate the neutrality of the patch. The exemplary histogram shows the number of pixels for each of 20×15 combinations of Neutral magnitude (x axis) and L* base lattice points and corresponding gray levels (vertical axis). In the illustrated background patch 160, the majority of pixels reside at an input gray level of ~230, with a neutral magnitude of greater than ~11. A small number of pixel values have neutral level magnitudes less than 11, e.g., due to scanner noise, copy paper defects, and the like.

Figure 12:
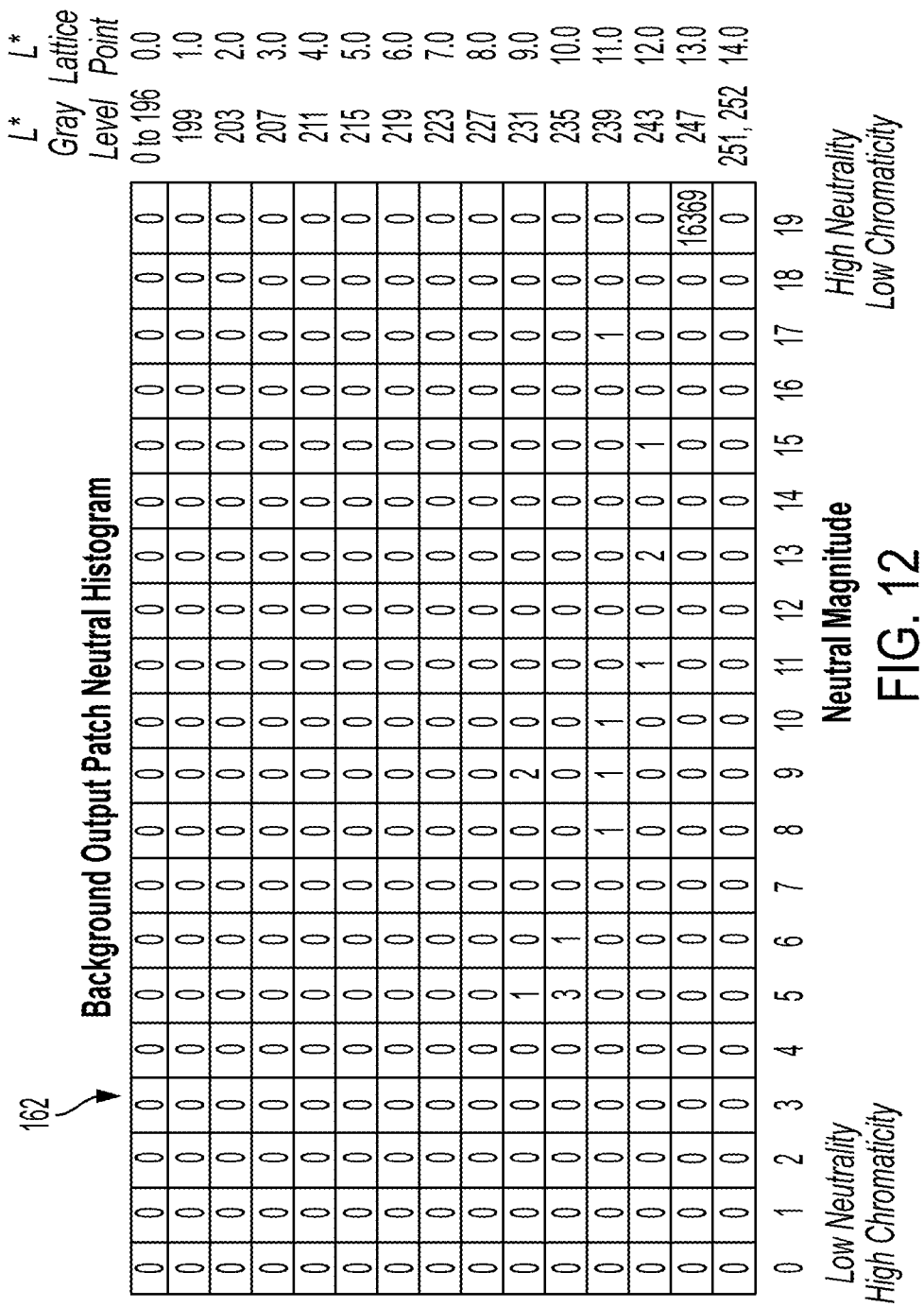
FIG. 12 illustrates a neutral histogram generated for a background patch of an image after to background adjustment.

FIG. 12 illustrates a neutrality chart for the background patch 160 of FIG. 11, after being processed by the neutral adjustment kernel. As can be seen, most of the background pixels are correctly processed and moved toward pure white.

Figure 13:
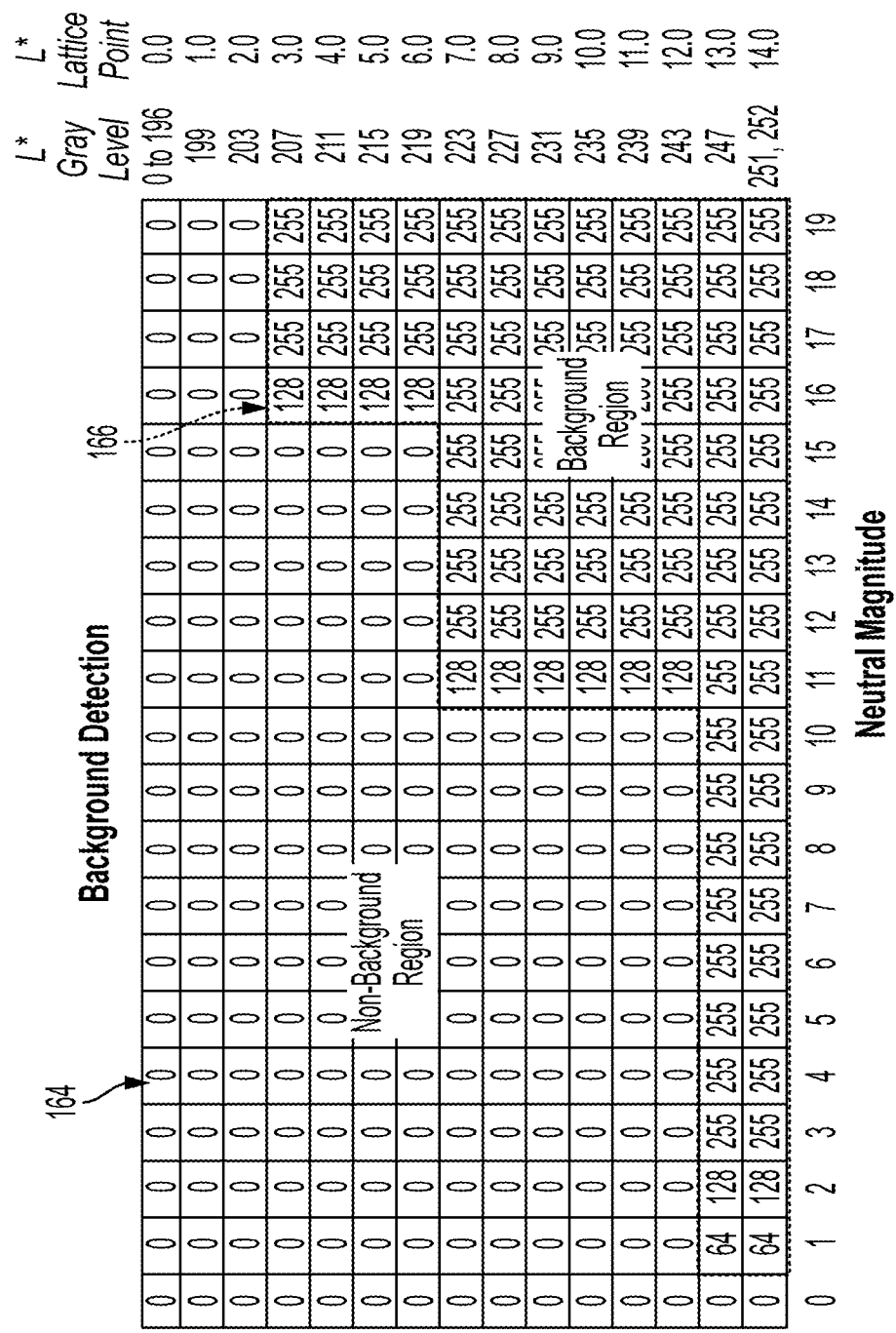
FIG. 13 illustrates a background detection histogram generated for a test image used to define functions for background adjustment.

A patch histogram 162 can be generated in the same way for a test page or patch thereof. This standard patch histogram can be used to calculate the optimal background adjust parameters for inputting to the trilinear interpolation input remapping 102, 103, 104 and (15×15×15) 3,375 lattice point table(s) 105. For example, as illustrated in FIG. 13, a neutrality chart 164 can be generated from the information in a test image region, which includes the corresponding 8-bit lattice-point values. A value of "255" is used to indicate a highly neutral pixel, whereas a value of "0" is a highly chromatic pixel. The background detection profile 166 shown in the neutrality chart illustrated in FIG. 13 was developed to handle a wide variety of common paper stock and therefore is designed to handle a wider range than what otherwise would have been ideal for a specific page.

Various methods exist for preparing the neutrality chart 164. In one embodiment, the "background" patch neutrality chart of FIG. 11 is used as a mechanism to partition the background and non-background border regions and ranges depicted in FIG. 13. In some embodiments, the data and border regions shown in FIG. 13 are manually generated as the result of observing what the neutrality characteristics of the background chart of FIG. 11 appear to be. The populated neutrality data of FIG. 13 can then be used to generate automatically the remapping data and 3,375 lattice points that are stored in memory of the image adjustment unit 12. In other embodiments, the background patch is captured on a page-by-page basis, and the transition region(s) shown in FIG. 13 are automatically generated using software trained to do so. The same software can be used to generate the remapping and lattice point LUT data. This automatic method can more easily take into account variations in the customer's paper stock/media, thereby improving image quality for any given copy job.

In general, therefore, the neutral background region shown in FIG. 6 is defined and generated by appropriately programming the trilinear interpolation lattice points and input remapping LUTs to whatever regions of the L*a*b* gamut are to be classified as background.

The lattice points in table 105 are programmable and could therefore be uniquely and precisely tuned/optimized on a page-by-page basis, if desired, by using a background detection kernel, which could be page-based or region-based, such as leading edge region.

Without intending to limit the scope of the exemplary embodiment, the following Example demonstrates application of the system and method.

Example

Figure 14A:
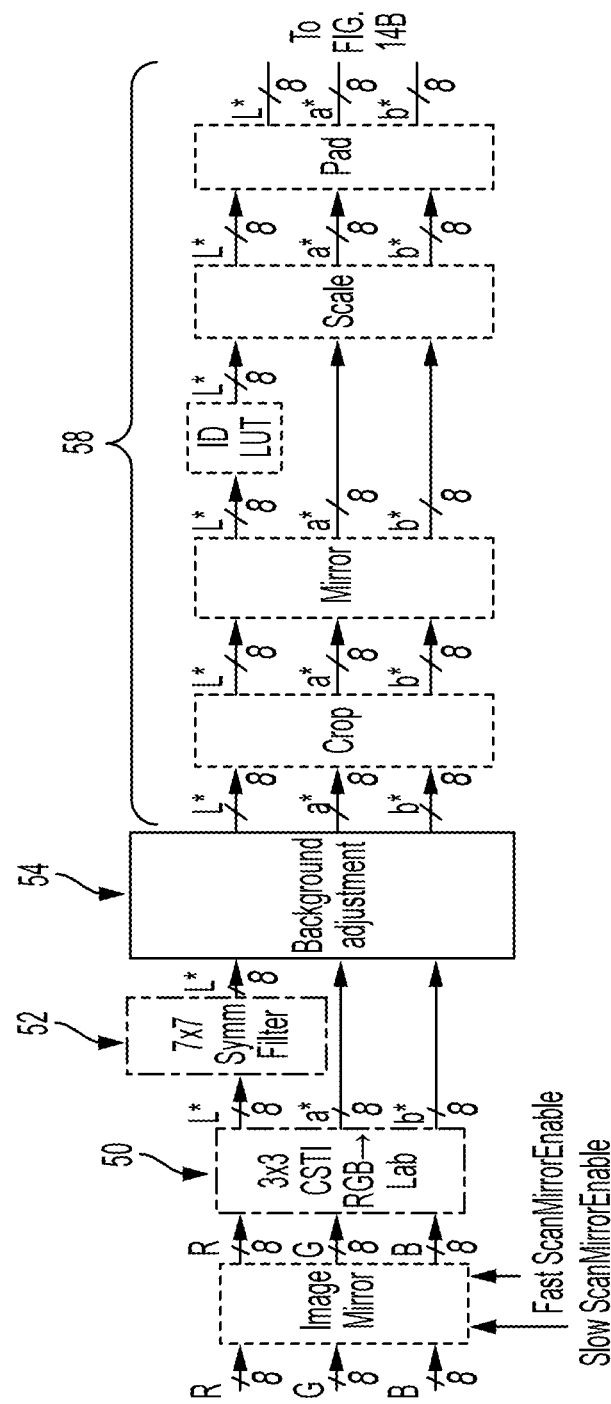
FIG. 14, which is split into FIGS. 14A and 14B for ease of illustration, shows a software image processing path used to evaluate the method.
Figure 14B:
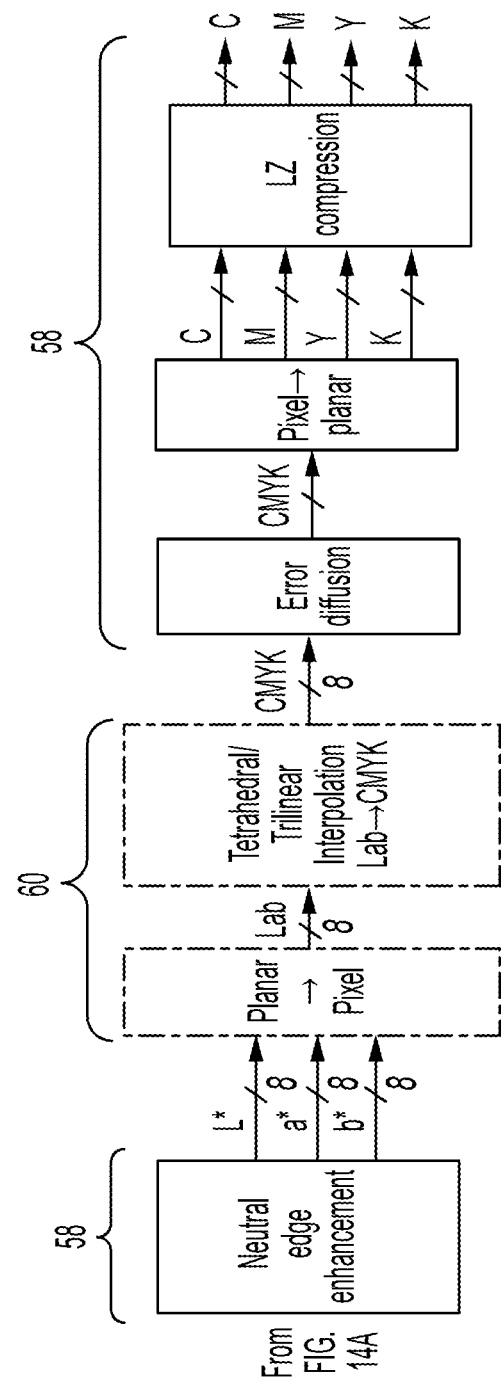

FIG. 14 (which is split into FIGS. 14A and 14B) illustrates an example software image path which is used to evaluate the method. In addition to the background adjustment component 54, discussed above with reference to FIGS. 2 and 4, components of the image path include a first conversion component 50, a second conversion component 60, and various preprocessing and post-processing components 52, 58. These include a symmetric filter, and components for cropping, scaling, padding, neutral (gray) edge enhancement, error diffusion, and compression. The first conversion (RGB to L*a*b*) is performed by a 3×3 color space conversion component. The second conversion (L*a*b* to CMYK) is performed by trilinear interpolation. In the background adjustment component 54, the trilinear interpolation component 98 and (3×3, 5×5, or 7×7) box filter 92 are compiled with Intel precompiled GPU kernels. The background adjust kernel 94 is generated using OpenCL language employing vectorized simd intrinsics (compiled on an ApolloLake™ GPU). The first conversion, neutral edge enhancement, and second conversion are performed with a GPU kernel (Intel precompiled GPU). Each kernel is multi-threaded and processes the image on a tile-by-tile basis in order to accelerate the overall graph times. The three input remapping LUTs, the luminance strength LUT 122, and the background strength LUT 120 (as shown in FIGS. 5 and 7) are each 256-element, floating-point LUTs.

Figure 16A:
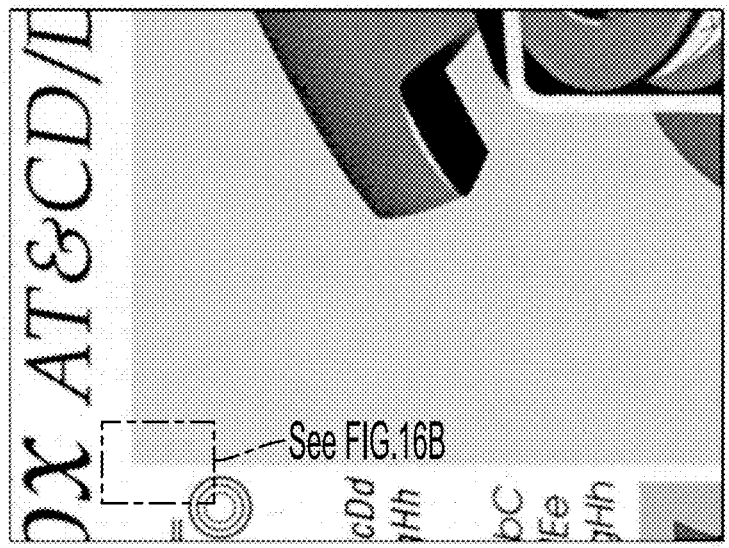
FIG. 16, which is split into FIGS. 16A and 16B for ease of illustration, illustrates improved image adjustment by the exemplary method.
Figure 16B:
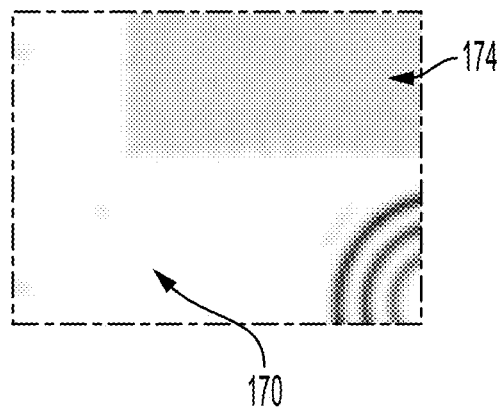

FIG. 15 illustrates artifacts which can occur in conventional processing of an original image 16 to suppress background. While the output image 20 (enlarged in FIG. 15B), has a whiter background region 170, around the border, there are some spots 172 visible in this region, and the colored halftone region 174 shows a lack of uniformity (punch through). As illustrated in FIG. 16A (enlarged in FIG. 16B), using the present method, the background region 170 is mostly neutral white while the adjacent colored patch 174 is more uniform.

It is to be appreciated that although FIGS. 15 and 16 are shown in grey scale, the images evaluated are multi-colored. Additionally, the images, as reproduced herein, may not accurately reflect the images evaluated.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image processing device comprising:
memory which stores:
a background adjustment component which for each of a plurality of pixels of an input image:
computes a background strength of the pixel;
computes a luminance strength of the pixel; and
computes adjusted luminance and adjusted chrominance values for the pixel, as a function of the background strength and luminance strength of the pixel; and
an image output component which outputs an output image derived from the adjusted luminance and adjusted chrominance values for the plurality of pixels, and
a processor which implements the background adjustment component and image output component.

2. The image processing device of claim 1, wherein the background strength of each of the plurality of pixel is derived from a luminance value of the pixel.

3. The image processing device of claim 2, wherein the background strength of each of the plurality of pixel is derived from an aggregated background level which is derived the luminance value of the pixel and luminance values of a set of local pixels.

4. The image processing device of claim 3, wherein the background strength of each of the plurality of pixels is computed as a non-linear function of the aggregated background level.

5. The image processing device of claim 1, wherein the luminance strength of each of the plurality of pixels is computed as a non-linear function of the luminance value of the pixel.

6. The image processing device of claim 1, wherein for each of the plurality of pixels, the background adjustment component computes adjusted luminance value and adjusted chrominance values as a function of the background strength and luminance strength of the pixel.

7. The image processing device of claim 6, wherein for each of the plurality of pixels, the background adjustment component computes a background adjust factor as a product of the background strength and luminance strength of the pixel, which is used as a multiplier in computing adjusted luminance and adjusted chrominance values.

8. The image processing device of claim 7, wherein for each of the plurality of pixels, the background adjustment component computes the adjusted luminance value $L^*_{adj}$, and adjusted chrominance values $a^*_{adj}$ and $b^*_{adj}$ from the respective input luminance values $L^*$, $a^*$, and $b^*$ according to:

$$L^*_{adj} = L^* + [(L^*_{max} - L^*) \times B] \quad (1),$$

$$a^*_{adj} = a^* + [(a^*_{max} - a^*) \times B] \quad (2),$$

$$b^*_{adj} = b^* + [(b^*_{max} - b^*) \times B] \quad (3),$$

where B represents the background adjust factor, and $L^*_{max}$, $a^*_{max}$, and $b^*_{max}$ are the maximum values of the luminance and chrominance values.

9. The image processing device of claim 1, wherein for each of the plurality of pixels, the background adjustment component determines whether the adjusted luminance value exceeds a sweep threshold and wherein when the adjusted luminance value exceeds the sweep threshold, the pixel's adjusted luminance and adjusted chrominance values are set to their respective maximum values corresponding to white, otherwise the pixel's adjusted luminance and adjusted chrominance values are unchanged.

10. The image processing device of claim 1, further comprising:
a first conversion component which converts the plurality of pixels of the input image from an input color space to a luminance-chrominance color space; and
a second conversion component which converts the adjusted luminance value and adjusted chrominance values for the plurality of pixels to an output color space.

11. The image processing device of claim 10, further comprising at least one of:
a preprocessing component which performs preprocessing of the plurality of pixels in the luminance-chrominance color space prior to background adjustment; and
a postprocessing component which performs postprocessing of the plurality of pixels in the luminance-chrominance color space after the background adjustment.

12. The image processing device of claim 1, further comprising an image output device which renders the output image.

13. The image processing device of claim 12, wherein the image output device comprises at least one of:
a printer which renders the output image on print media, and
a display device which displays the output image on a display screen.

14. An image processing method comprising:
receiving an input image comprising a plurality of pixels;
for each of the plurality of pixels:
computing a background strength of the pixel;
computing a luminance strength of the pixel; and
computing an adjusted luminance value and adjusted chrominance values for the pixel, as a function of the background strength and luminance strength of the pixel; and
outputting an output image derived from the adjusted luminance and adjusted chrominance values for the plurality of pixels.

15. The image processing method of claim 14, wherein:
the background strength of each of the plurality of pixels is computed as a non-linear function of a luminance value of the pixel or a non-linear function of an aggregate of luminance value of the pixel and luminance values of a set of local pixels; and/or
wherein the luminance strength of each of the plurality of pixels is computed as a non-linear function of the luminance value of the pixel.

16. The image processing method of claim 14, wherein for each of the plurality of pixels, the adjusted luminance value and adjusted chrominance values are computed as a function of a product of the background strength and luminance strength of the pixel.

17. The image processing method of claim 16, wherein for each of the plurality of pixels, the adjusted luminance value $L^*_{adj}$, and adjusted chrominance values $a^*_{adj}$ and $b^*_{adj}$ are computed from the respective input luminance values $L^*$, $a^*$, and $b^*$ according to:

$$L^*_{adj} = L^* + [(L^*_{max} - L^*) \times B] \quad (1),$$

$$a^*_{adj} = a^* + [(a^*_{max} - a^*) \times B] \quad (2),$$

$$b^*_{adj} = b^* + [(b^*_{max} - b^*) \times B] \quad (3),$$

where B represents the product of the background strength and luminance strength of the pixel, and
$L^*_{max}$, $a^*_{max}$, and $b^*_{max}$ are the maximum values of the luminance and chrominance values.

18. The image processing method of claim 14, wherein for each of the plurality of pixels, the method further comprises determining whether the adjusted luminance value exceeds a sweep threshold and wherein when the adjusted luminance value exceeds the sweep threshold, setting the pixel's adjusted luminance and adjusted chrominance values to respective maximum values corresponding to white, otherwise leaving the pixel's adjusted luminance and adjusted chrominance values unchanged.

19. The image processing method of claim 14, further comprising at least one of:
converting the plurality of pixels of the input image from an input color space to a luminance-chrominance color space;
converting the adjusted luminance value and adjusted chrominance values for the plurality of pixels to an output color space; and
printing the output image.

20. An image processing device comprising:
an image adjustment unit which receives an input image, the image adjustment unit including a background adjustment component which for each of a plurality of pixels of an input image:
computes a background strength of the pixel;
computes a luminance strength of the pixel; and
computes adjusted luminance and adjusted chrominance values for the pixel, as a function of the background strength and luminance strength of the pixel; and
an image output device which receives an output image derived from the adjusted luminance and adjusted chrominance values for the plurality of pixels, and which renders the output image by printing.

* * * * *